US006771224B2

United States Patent
Apostolos

(10) Patent No.: US 6,771,224 B2
(45) Date of Patent: Aug. 3, 2004

(54) DIRECTION FINDING SYSTEM USING BODY-WORN ANTENNA

(75) Inventor: John T. Apostolos, Merrimack, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 12 days.

(21) Appl. No.: 10/190,020

(22) Filed: Jul. 3, 2002

(65) Prior Publication Data

US 2004/0004573 A1 Jan. 8, 2004

(51) Int. Cl.[7] ................................ H01Q 1/12

(52) U.S. Cl. ....................... 343/718; 343/751

(58) Field of Search ................. 343/718, 868, 343/700 MS

(56) References Cited

U.S. PATENT DOCUMENTS

| | | | | |
|---|---|---|---|---|
| 3,902,118 A | * | 8/1975 | Ikrath et al. | 325/118 |
| 5,977,913 A | * | 11/1999 | Christ | 342/465 |
| 6,377,216 B1 | * | 4/2002 | Cheadle et al. | 343/700 MS |

* cited by examiner

Primary Examiner—James Vannucci
(74) Attorney, Agent, or Firm—Daniel J. Long; Robert K. Tendler

(57) ABSTRACT

Body-worn antennas operate in combination with a direction finding processor to be able to detect the presence of electromagnetic radiation involved in communication as well as the direction of the source of the electromagnetic radiation. In one embodiment, a number of wide bandwidth antennas, 2 MHz to 40 GHz, are incorporated into a body-worn vest or garment such that an individual wearing the vest is being provided with a wearable system for indicating the direction of the source of incoming signals. If the orientation and geographic location of the individual are known via the use of a compass and/or by GPS receiver, the source of the radiation can be pinpointed by triangulation with inputs from other body-worn units. For omni-directional detection, pairs of antennas are provided with feed points or spigots which are fed in phase. Once an incoming source of electromagnetic radiation is detected, a direction finding analysis is conducted by sampling the spigots separately and proceeding with correlation interferometric direction finding. For troops in the field or police officers, the bearing of the source is most useful in knowing where the enemy or perpetrator is. In a preferred embodiment, each of the antennas is a meander line loaded antenna, in which the meander line loaded antennas are provided with a virtual ground plane passing through the body of the individual wearing the antennas. In order to provide the virtual ground plane, the antennas on the front of the vest provided are provided with corresponding duplicate meander line loaded antennas on the back of the vest. Meander line antennas are utilized due to their wide bandwidth performance, with the conductive plates in one embodiment being flexible conductive fabric. Depending on the processing of the outputs from the antennas on the vest or other garment, the system will work either with the individual in a standing mode or when the wearer is lying prone on the ground.

17 Claims, 8 Drawing Sheets

DIRECTION FINDING SYSTEM USING BODY-WORN ANTENNA

FIELD OF INVENTION

This invention relates to the determination of the existence and direction of incoming electromagnetic radiation, and, more particularly, to a body-worn system for pinpointing the source of such electromagnetic radiation.

BACKGROUND OF THE INVENTION

For police work and, indeed, for military purposes, is oftentimes required that the source of an electromagnetic radiation be detected so that appropriate police or military action can take place. The electromagnetic radiation can come from as diverse sources as cell phones, military radios or any of a wide variety of transmitters, which, in general, are mobile, the location of which is important to the authorities.

For instance, in a border patrol scenario, when border patrol agents are seeking to locate individuals seeking to cross a border, if they are communicating with electromagnetic radiation, it is important to be able to find the direction of the sources, if not to pinpoint the source of the electromagnetic radiation, and, thereby, catch the invading border crossers.

Likewise, in a military situation, it is often required to be able to locate the source of a particular communications signal and to do so by direction finding means. In general, more accurate direction finding provides a bearing line indicating the direction of the enemy triangulation using multiple direction finders. It is also important for accuracy to be able to have a number of different direction finding units in the field so that through triangulation, the direction finding results from each of the units in the field as to the source can be pinpointed. The more direction finding units, the lower the area of uncertainty. The area of uncertainty, amongst other things, is dependent upon the number of direction finding fixes that are made.

While direction finding apparatus has been used in the past from fixed locations or mobile vehicles, it is important to be able to provide such signal detection and source location determination at each police officer or soldier assuming each of the police officers or troops could be provided with a simple direction finding apparatus, the operation of which is transparent to the individual as he or she carries out his or her duties.

There is therefore a need for the ability to detect where a communication is coming from to pinpoint the sources of electromagnetic radiation, and to do so in the manner that does not impede or impair other functions of the police officers or troops as they carry out their assigned duties. It is also a requirement that it not be necessary for the police officers or the troops to have any active partcipation in the detection of and location of the incoming electromagnetic signals. In short, it is a requirement that the system be a completely automatic so that nothing carried by the police officer or the soldier needs to be activated or in any way interacted with during the course of the maneuvers for which the system was intended.

SUMMARY OF THE INVENTION

In order to find a portable direction finding receiver so that the direction of a source can be ascertained or so that multiple direction fixes may be used to pinpoint its location of a source, in the subject system, a plurality of direction finding antennas are embedded into a wearable garment, with the multiple antennas being arranged such that a direction finding algorithm based on their outputs can be used to determine the direction of an incoming electromagnetic signal so that the line of bearing to the source of the signal can be ascertained.

Just providing the general direction is extremely useful so that an individual can quickly determine the direction of the source. This is done by computing a bearing line and indicating the bearing line direction to the individual. This can be done simply with a series of vibrators embedded about the garment and by activating the vibrator which lays closest to the bearing line. Thus, a soldier can get a quick indication of where the enemy is.

Having numbers of such bearing lines from different individuals results in the ability to pinpoint the source of the incoming electromagnetic signal by triangulation.

For border patrol scenarios, this means being able to quickly find the direction of an individual making a wireless call and with a number of bearing lines to locate the individual with sufficient accuracy that they can be apprehended.

In addition to the direction finding apparatus, which is body-worn, in one embodiment a transmitter is also located within the wearable garment so that the results of the direction finding procedure can be transmitted to a central location where through the receipt of numbers of bearing lines, the precise location of the source can be calculated. For this purpose, both a GPS receiver and a compass are required for each individual.

It is obviously important to be able to detected and locate electromagnetic signals over a wide variety of frequencies. Since the frequency of the electromagnetic radiation is unknown, it is important to be able to provide wide-bandwidth antennas capable of detecting radiation from frequencies of 2 MHz to 40 GHz.

One type of wide-band width antenna particularly well-suited for this application is the meander line loaded antenna described in U.S. Pat. No. 6,323,814 issued to John Apostolos and incorporated herein by reference.

This antenna, in general, is comprised of two parallel plates connected together through a meander line, one purpose of which is to minimize the overall size of the antenna. As described in the above referenced patent, the meander line provides a series of delays through phase discontinuities such that the effective length of the antenna is increased over that which the physical size of the elements would dictate. One of the plates is a ground plane. However, when body-worn, the ground plane would pass through the body of the individual wearing the antennas. In one embodiment at a corresponding series of meander line loaded antennas are provided on the back of the vest, with the combined action of antennas on the front and back of the vest forming a virtual ground plane which runs through the individual's body where the real ground plane should go.

This means that effective broadband antennas can be brought down to a size that is wearable by an individual.

In one embodiment, as many as eight antennas are located on the body-worn garment, in one embodiment, a vest. An omni-directional mode is provided such that the presence of incoming electromagnetic radiation from any direction may be detected. The output pairs of antennas provide a so-called spigot, with omni-directional detection involving the spigots being fed in phase.

Once an incoming electromagnetic signal has been detected, direction finding analysis is conducted by sampling the spigots separately and proceeding with a correlation interferometric direction finding algorithm.

Knowing the geographical position and orientation of the antennas at any given moment in time through the utilization of a compass and a GPS receiver, the line of bearing from a precise point may be ascertained relative to magnetic north. With a number of transmissions of bearing lines from a number of locations to a central location the source of the electromagnetic radiation can be pinpointed.

The system is designed to operate whether the individual is standing upright or is lying on the ground, as would be the case during a military or border patrol operation. This is accomplished by processing the outputs of different pairs of antennas, whether the individual is standing up or is prone is determined by a sensor so that processing can be switched from the standing mode to the prone mode.

In one embodiment, the individual wearing the vest is unaware of the detection of incoming signals, or, in fact, the transmission of a bearing line, with the detection and direction finding being transparent to the individual as he or she goes about his or her duties. Alternatively, the individual can be immediately alerted as to the existence of a transmission and the direction it came from, i.e., "30° off to the right." The indication can be verbal with a synthetic voice or silent through lights or buzzers.

In operation, to pinpoint source location, a number of individuals are scattered about the countryside in an operation in which is it important to detect the existence of an incoming signal from a transmission and, also, the location of the source of the electromagnetic radiation. In one scenario, there may be as many as one hundred individuals wearing such wearable antennas and direction finding systems such that upon the occurrence of a transmission, the existence of the transmission and its line of bearing is ascertained by all of those individuals whose detectors are, in fact, detecting the transmission. There may be some individuals for whom detection is impossible due to various blockages or shielding. However, for the vast majority of these individuals in the area detection of the transmission is possible, along with determination of a bearing line through the use of direction finding techniques. The bearing line along with a position of the antennas and reference to magnetic north is transmitted to centralized location from each of the individuals and a precise determination is made through triangulation techniques. At that point, instructions can emanate from the central location as to how to take care of the source electromagnetic radiation, be it to go to the location and arrest the individual involved or to direct firepower to the location so as to eliminate the threat in a military sense.

It will be appreciated is that not only is the wearable antenna worthwhile in border patrol and military situations, for common police patrols where individuals are using cell phones for communication the detection of the transmission can make it infinitely easier to locate the individual, as he or she moves around the area. Not only are policing problems solved by the subject wearable system, the location of any kind of a offending transmissions such as an illegal transmission for which the Federal Communications Commission must act is within the scope of the subject invention. Thus, for instance, while it is usual for the Federal Communications Commission upon report of an illegal transmitter to send a vehicle with direction finding antennas on it, it is much more effective to send out a number of individuals wearing the subject body-worn system to more precisely locate the source of the offending radiation.

The subject system thus permits body-worn direction finding apparatus to be carried easily, with the results of the individual lines of position being usable to more accurately pinpoint sources of electromagnetic radiation. Whether used by police squads or by individuals, detecting and locating the source of a transmission is made easier through a body wearable series of antennas having wide-band width characteristics.

In summary, Body-worn antennas operate in combination with a direction finding processor to be able to detect the presence of electromagnetic radiation involved in communication as well as the direction of the source of the electromagnetic radiation. In one embodiment, a number of wide bandwidth antennas, 2 MHz to 40 GHz, are incorporated into a body-worn vest or garment such that an individual wearing the vest is being provided with a wearable system for indicating the direction of the source of incoming signals. If the orientation and geographic location of the individual are known via the use of a compass and/or by GPS receiver, the source of the radiation can be pinpointed by triangulation with inputs from other body-worn units. For omni-directional detection, pairs of antennas are provided with feed points or spigots which are fed in phase. Once an incoming source of electromagnetic radiation is detected, a direction finding analysis is conducted by sampling the spigots separately and proceeding with correlation interferometric direction finding. For troops in the field or police officers, the bearing of the source is most useful in knowing where the enemy or perpetrator is. In a preferred embodiment, each of the antennas is a meander line loaded antenna, in which the meander line loaded antennas are provided with a virtual ground plane passing through the body of the individual wearing the antennas. In order to provide the virtual ground plane, the antennas on the front of the vest provided are provided with corresponding duplicate meander line loaded antennas on the back of the vest. Meander line antennas are utilized due to their wide bandwidth performance, with the conductive plates in one embodiment being flexible conductive fabric. Depending on the processing of the outputs from the antennas on the vest or other garment, the system will work either with the individual in a standing mode or when the wearer is lying prone on the ground.

BRIEF DESCRIPTION OF THE DRAWINGS

These are the features of the subject invention would be better understood in connection with the Detailed Description in conjunction with the Drawings, of which.

DETAILED DESCRIPTION

Figure 1:
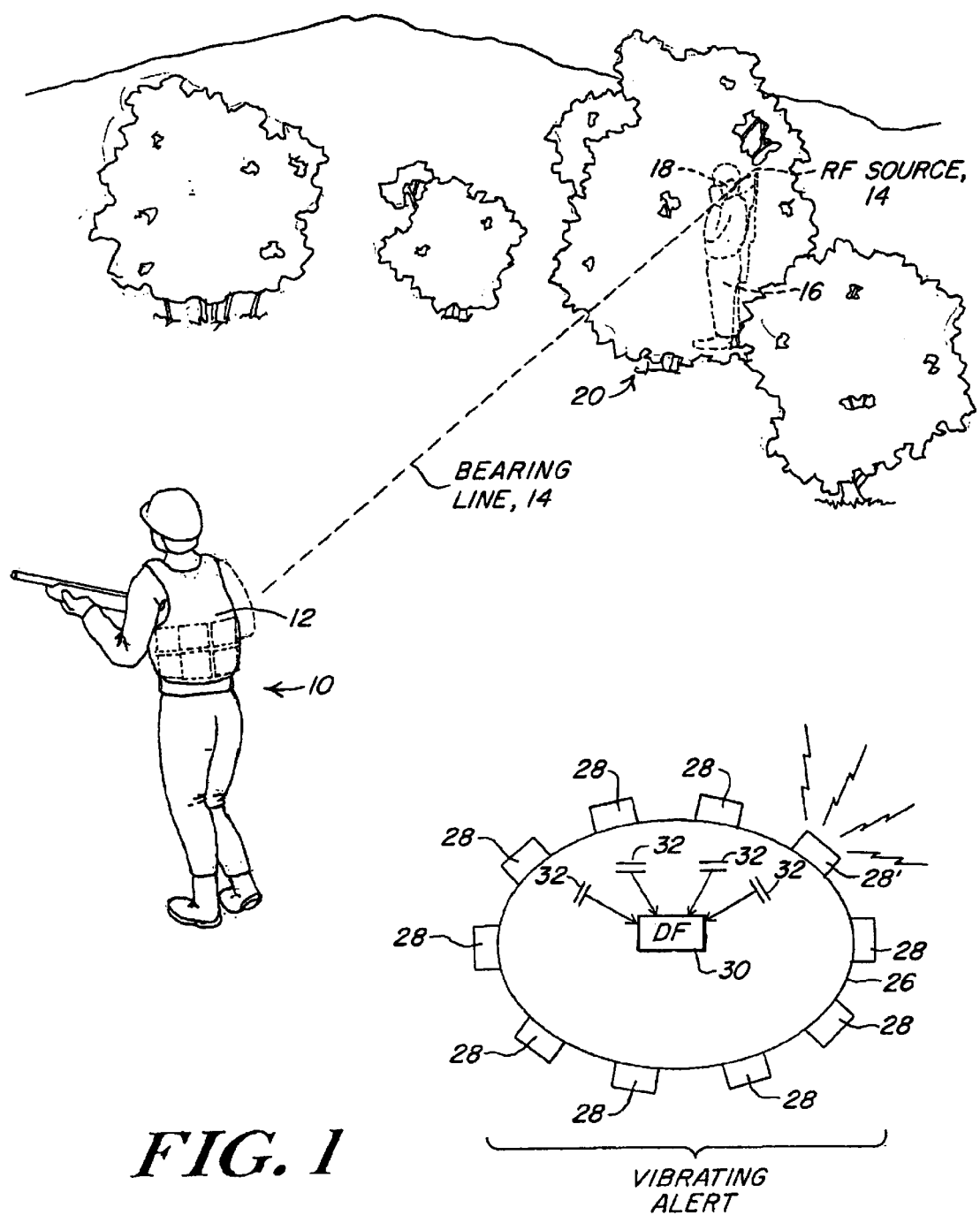
FIG. 1 is a diagrammatic illustration of the utilization of the subject body-worn antenna system to alert an individual as to the direction of an RF source through the utilization of pairs of antennas embedded in a vest worn by the individual, with the individual also having a location alerting system in the form of a belt of vibrators, with the vibrator activated which is on a bearing line between the individual and the RF source.

Referring now to FIG. 1, a scenario is depicted in which an individual 10 is provided with a vest 12 into which is embedded a number of direction finding antennas and a direction finding module which determines upon detection of incoming radiation the bearing line 14 from the individual to an RF source 14 responsible for the radiation.

In a tactical situation, the individual may be a soldier in which an enemy soldier, here illustrated at 16, is utilizing a transmitter 18 to communicate with other troops in the area. As can be seen from the dotted outline, enemy soldier 16 is not visible as being behind a tree 20, such that during the course of an operation, he may be identified at least as to where he is relative to the individual wearing the body-carried antennas and direction finding equipment.

Individual 10 in one embodiment is provided with a system for alerting the individual as to the direction of an incoming signal. As illustrated, the individual is provided with a belt 26 having individual vibrators 28 mounted around the periphery of the belt. In this case, a direction finding module 30 is embedded in a vest worn by the individual that is connected to a series of embedded direction finding antennas 32, the outputs of which are used to determine bearing line 14. This line is the bearing line of the RF source relative to the individual. Upon determining the bearing line, a vibrator 28' is activated to give the individual an indication of the direction of the RF source.

Not only is the above scenario useful in warfare, it may also be useful for instance for border crossing guards to locate illegal aliens crossing a border, or it may be used by the police to simply indicate the direction of a person utilizing a cell phone. In so doing, the subject system assists in apprehending of the individual due to the indication of where the individual in question is.

Not only is the subject system usable to locate individuals, it is possible to utilize these highly man-portable units to locate any source of RF energy relative to the individual on whom the body mounted antennas are carried. Thus, the subject system is useful, for instance, for individual Federal Communication Commission inspectors to locate rogue transmitters.

Figure 2:
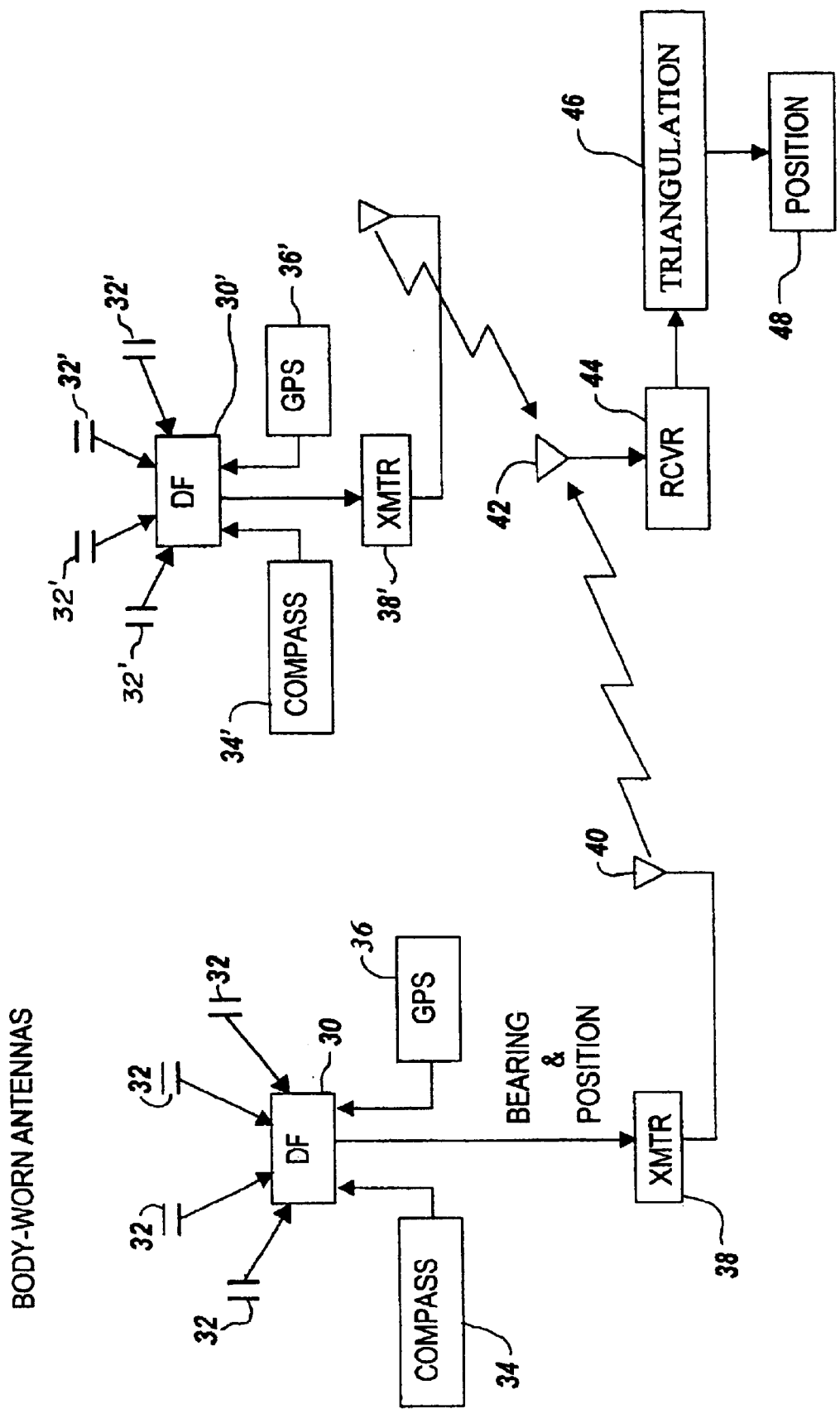
FIG. 2 is a block diagram of the utilization of the subject system in which the individual in addition to having body-worn antennas coupled to a direction finding module is also provided with compass and a GPS receiver, such that the bearing line along with the position of the start of the bearing line is transmitted from the individual to a remote location where triangulation from a number of individuals is used to pinpoint the location of the RF source.

Referring now to FIG. 2, an extension of the subject system involves the provision at the individual of means for ascertaining the orientation of the antennas. In one embodiment, this is provided by a compass or other device 34. Additionally, the exact position of the individual is given by a GPS receiver 36 or like device. What is then available from the direction finding module is the bearing and the origin of the bearing line which is the position of the individual as given the GPS receiver. This is transmitted via a transmitter 38 and an antenna 40 to an antenna 42 coupled to a receiver 44. The receiver decodes the origin of the bearing line and its angle, and provides this information to a triangulation unit 46 such that upon receipt of at least one other bearing line and its origin from another individual, the source may be pinpointed. This information is derived from the associated direction finding unit 30' and transmitter 38' to arrive at the direction of the antennas 32' and their geographic position from the output of the GPS receiver 36'.

Upon triangulation, the position of the RF source as illustrated at 48 may be ascertained and action taken, having-determined the precise location of the radiating source.

Figure 3:
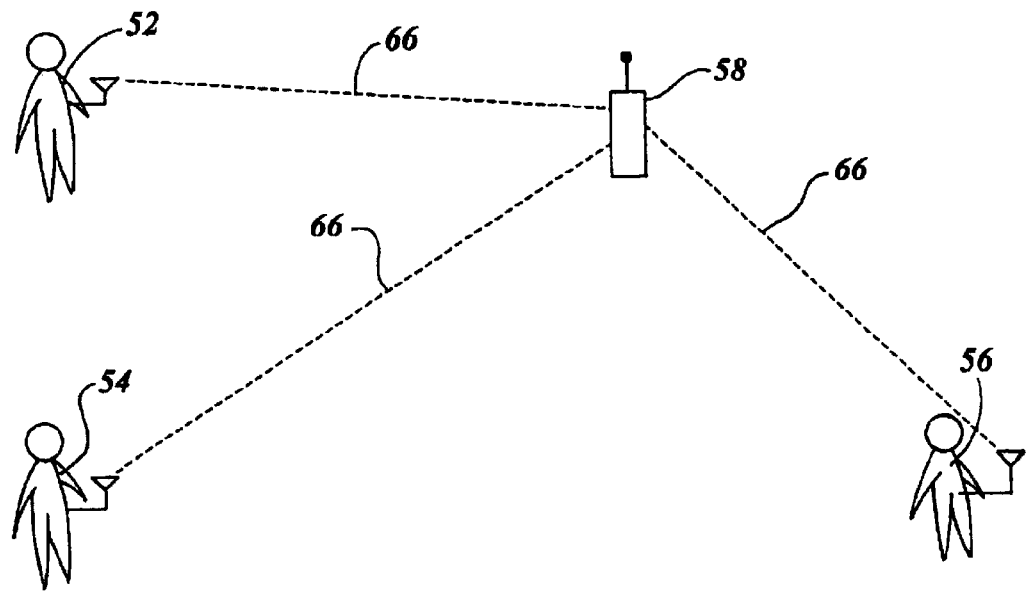
FIG. 3 is diagrammatic illustration of the utilization of a number of individual's each having body-worn antennas and a direction finding system, in which the results of detection of an RF source including bearing lines to the source are transmitted to a central processing location where triangulation pinpoints the source of the transmission, with an increasing number of individuals outfitted with a direction finding system decreasing the area of uncertainty in the position of the RF source.
Figure 3:
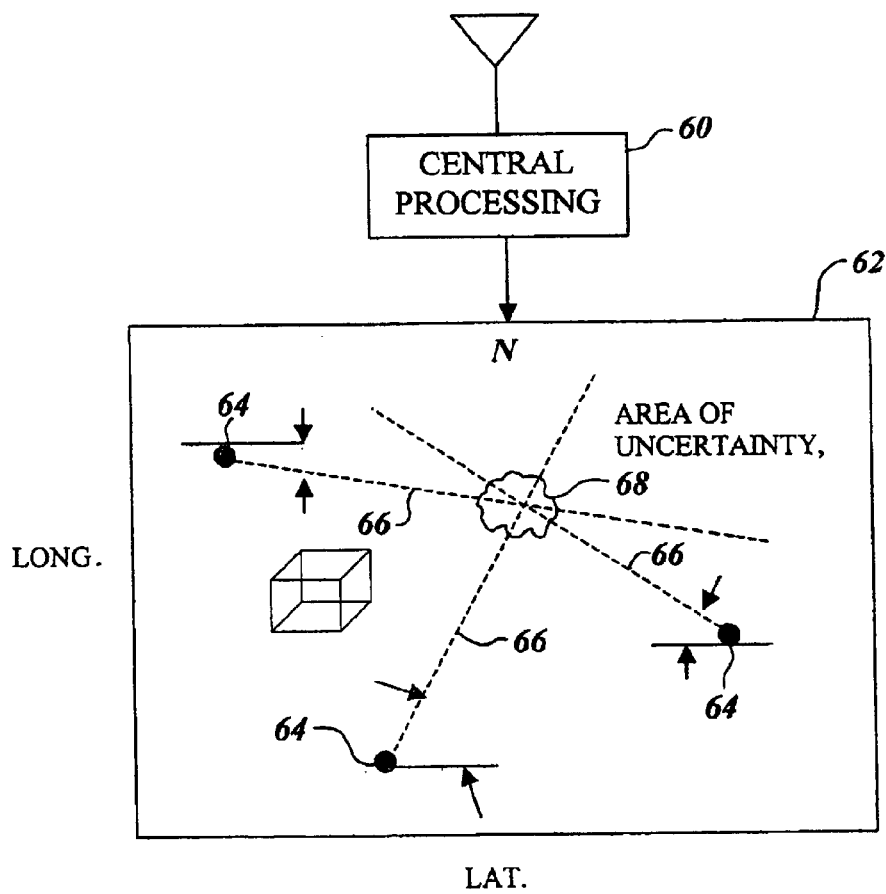

Referring to FIG. 3, as will be seen, a number of individuals 52, 54 and 56 each have direction finding modules and antennas along with GPS receivers and compasses such that the position of a radiating source illustrated at 58 may be determined by transmitting the information associated with FIG. 2 to a central processing unit 60. The output of central processing unit 60 is: coupled to a display 62 that presents a map illustrating the positions 64 of each of the individuals and the associated bearing lines 66. Where the bearing lines cross is the position of the radiating source that, in general, has an area of uncertainty.

Because the position of each of the individuals is known along with the angle of the bearing line, the position of the radiating source can be easily ascertained. It will be appreciated that the larger number of individuals having such equipment, the more accurate will be the pinpointing of the RF source with a concomitant decrease in the area of uncertainty 68.

Figure 4:
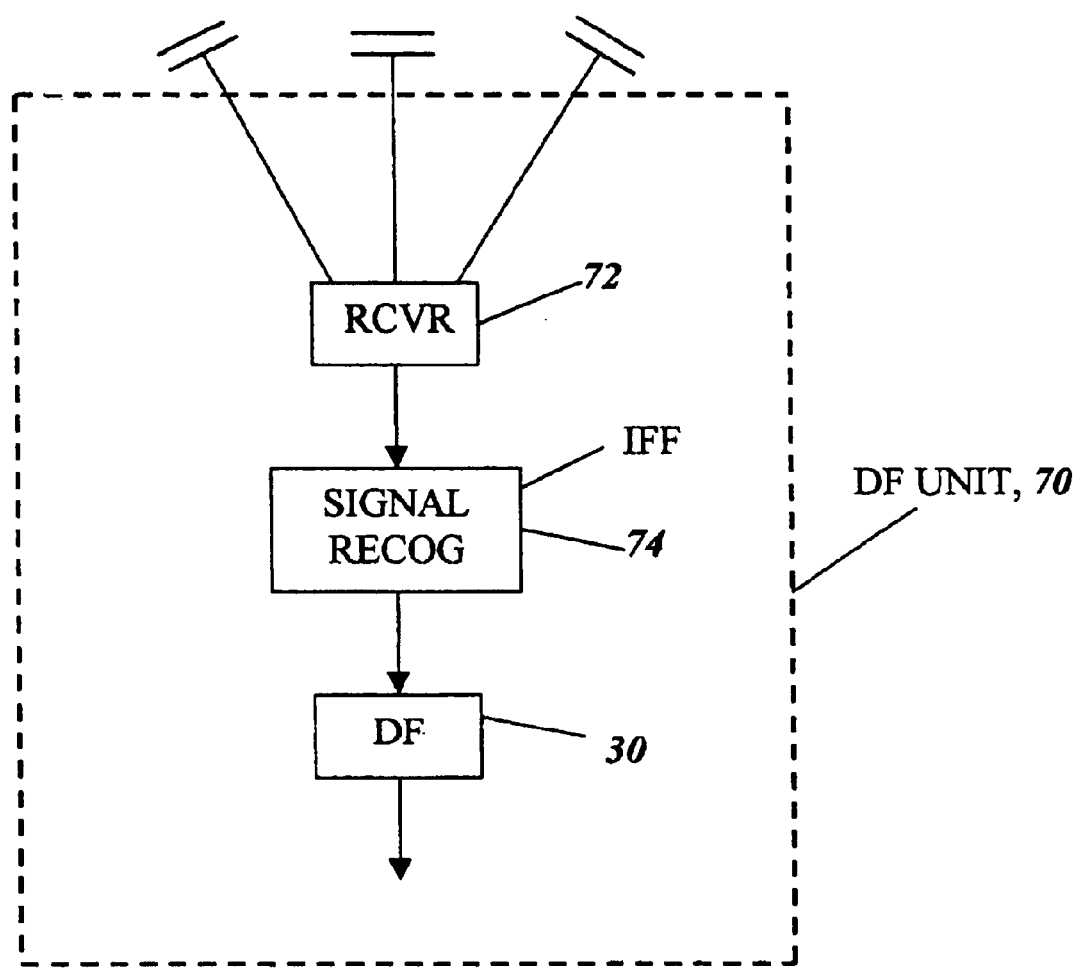
FIG. 4 is a block diagram illustrating the utilization of a signal recognition system between the receiver coupled to the embedded antennas and the direction finding module, thus to provide a signal recognition function to filter out unwanted signals which permits an IFF, identify friend or foe function.

As illustrated in FIG. 4, direction finding module 70 may include not only a receiver 72 for detecting the signals from the aforementioned antennas, it also may include a signal recognition circuit or module 74 which is utilized to categorize the incoming signals which are detected at receiver 72. The signal recognition circuit can for instance include a database that will establish whether the incoming signal is from a friend or foe, namely IFF detection, with only signals which are determined to be useful provided to direction finding module 30.

As will be described, the antennas suitable for embedding in a garment carried by the individual are wide bandwidth antennas due to the utilization of meander line techniques such as described in the aforementioned patent. The purpose of using meander line antennas is to provide a reasonable gain at a wide variety of frequencies, in one case, from 2 MHz to 40 GHz. This can result in the detection of large numbers of incoming signals. It is therefore important to able to provide some kind of signal recognition circuitry to be able to weed out those signals not of interest. Such signal recognition systems are as described in U.S. Pat. No. 4,166,980 assigned to the assignee hereof incorporated herein by reference.

In order for direction finding to occur, pairs of antennas are utilized with the outputs of the pairs of antennas being analyzed by the direction finding module.

Figure 5:
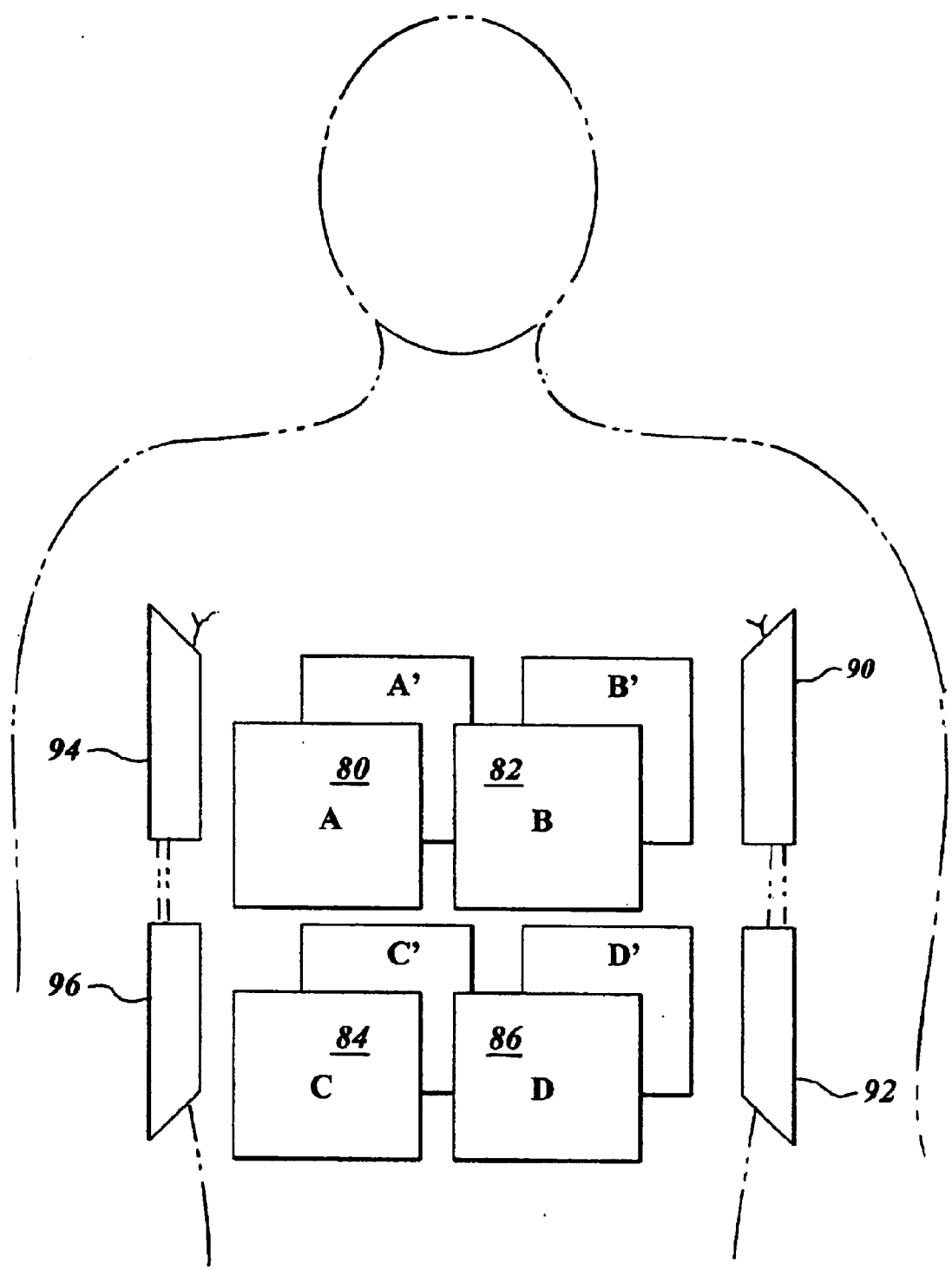
FIG. 5 is diagrammatic illustration of the placement of direction finding antennas on the vest of an individual illustrating a configuration which permits direction finding not only when the individual is standing but also when the individual is lying on the ground.

Referring to FIG. 5, pairs of antennas are illustrated at 80, 82, 84 and 86 to include parallel plates that are connected with the aforementioned meander lines. The plates are designated as A, B, C, and D; and A', B', C', and D'. As will be seen by the following algorithm, the spigots that are the result of the signals from adjacent antennas are used in the direction finding algorithm.

It will be noted that the feed points between adjacent antennas are that which constitute the aforementioned spigots, with the spigots then providing signals that are used in the direction finding algorithm.

The direction finding algorithm is now prescribed.

Direction Finding Algorithm

The correlation interferometric direction finding (CIDF) algorithm is as follows:

The phase and amplitude present at each of the four spigots are measured. The phase and amplitude are converted into real and imaginary parts to create a complex number, $$e.g., \quad S' = S'_{real} + j S'_{imag} \quad j = \sqrt{-1}$$

There are four numbers of $S^1$, $S^2$, $S^3$, and $S^4$ corresponding to the spigots below:

|    | Standing Spigots | Prone Spigots |
|----|------------------|---------------|
| $S^1$ | A – B | A – D |
| $S^2$ | B – D | B – C |
| $S^3$ | A' – B' | A' – D' |
| $S^4$ | B' – D' | B' – C' |

The system is first calibrated by sampling incident waves every degree, every 10 MHz. This creates 32,400 sets of $S^1$, $S^2$, $S^3$, and $S^4$. Treat this set as a four component complex vector $V_i$, where "i" goes from 1–32,400. When a signal of interest (SOI) is acquired, the measurements of the voltages at the four spigots are made, and a four-component vector $V_{SOI}$ is created. A correlation co-efficient (CC) is calculated for each of the 32,400 stored vectors and the signal of interest.

$$CC_i = CC_I = \frac{V_{SOI} \cdot V_i^*}{|V_{SOI}| \, |V_i|}$$

\* ~ Complex Conjugate

· ~ Dot Product

The largest $CC_1$ is assumed to be the vector representing the angle of arrival of the signal of interest.

Note that the system can be used in a standing or prone mode. The combination of antennas for each mode is as follows:

Standing Omni Acquisition Mode (A–B)+(B–D)+(A'–B')+(B'–D')

Prone Omni Acquisition Mode (A–D)–(A'–D')+j(B–C)–j(B'–C")

where j=√−1

Figure 6:
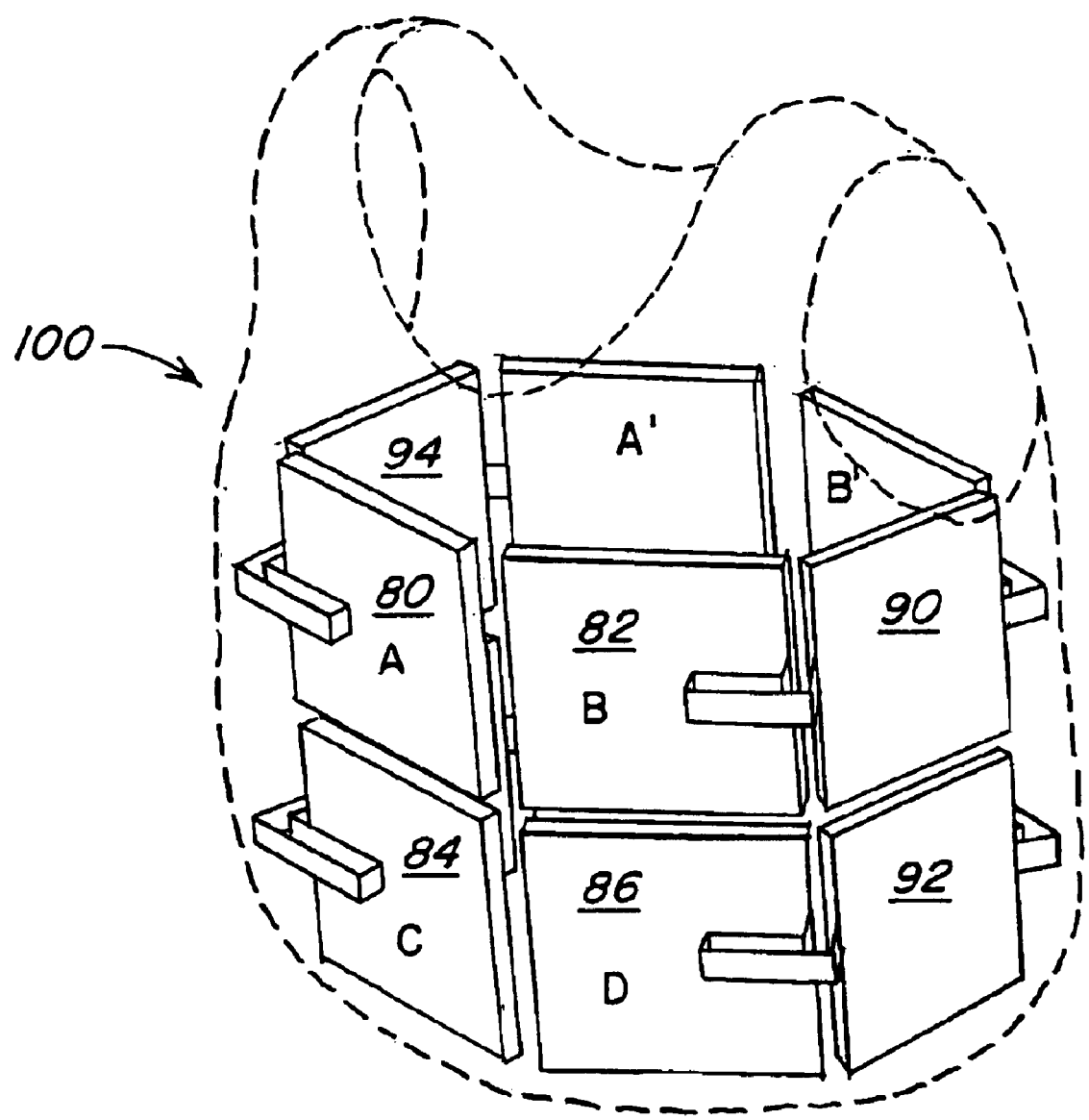
FIG. 6 is diagrammatic illustration of the vest on an individual illustrating the placement of the body-worn antennas.

As can be seen in FIG. 6, in one embodiment a vest 100 is used to mount the various antennas of FIG. 5, with antennas 82 and 86 being clearly visible.

As will be described in connection with FIGS. 7 and 8, it is possible for an individual wearing such a vest or garment to provide bearing lines from pairs of antennas which are embedded therein, both when the individual is standing upright and also when the individual is lying prone. Thus, for instance, a soldier crawling along the ground can then be provided with an indication of the presence of enemy troops, if the enemy troops are involved in any kind of RF communications.

Figure 7:
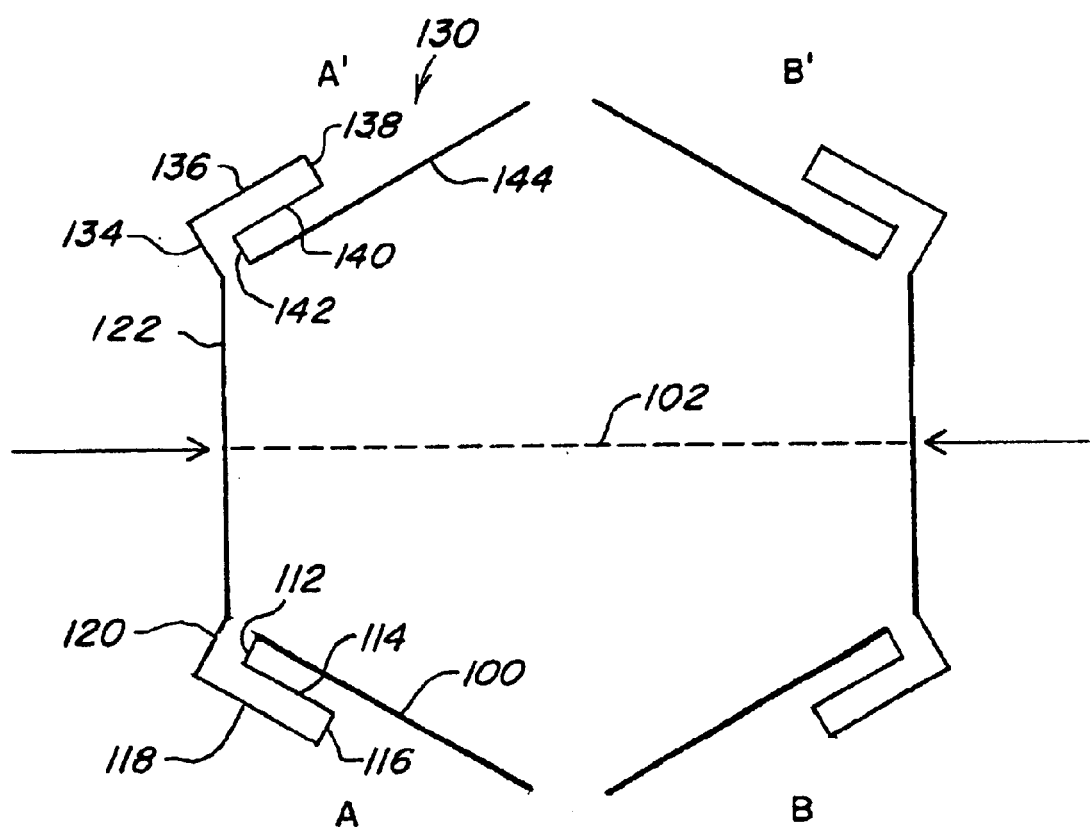
FIG. 7 is a top view of vest-mounted antennas indicating the creation of a virtual ground plane for the antennas.

Referring now to FIG. 7, a top view of the body mounted antenna configuration in which for purposes of illustration antennas A and B are depicted. Structures labeled A' and B' are utilized to complete the A and B antenna structures by providing a virtual ground plane here illustrated by dotted line 102. Thus, for instance, plate 100 is provided with a ground plane due to the structure illustrated in A'.

The reason for providing a virtual ground plane in the above manner is that since this body mounted antenna configuration must be placed around the body, there is no place for a real ground plane to exist. This is because it would pass right through the individual's body.

In this embodiment, the antenna A is made up of plate 100 which has at one end thereof an upstanding plate 112 which is connected to a folded back portion 114 of the meander line. The meander line also has an upstanding portion 116 and a further folded back portion 118. At the distal end of portion 118 is a portion 120 that forms a gap between plate 122 and portion 112. The gap is essential in some types of meander line loaded antennas to increase bandwidth. Note that the complete antenna includes plate 100 and virtual ground plane 102, with a meander line there between. The space between portions 112 and 122 provides a reactance reduction to increase bandwidth.

Portion 120 is coupled by a side plate 122 to an identical mirror structure A' here illustrated at 130. For antenna A', plate 122 is an extension of the initial plate and is connected to an upstanding portion 134 connected to a portion 136 of a meander line having an upstanding portion 138 which connects to a folded back portion 140, and an upstanding portion 142 connecting to a plate 144.

In short, the meander line loaded antenna, absent the ground plane, comprises at portion 100, 112, 114, 116, 118, 120 and 122. The meander line portion of this antenna is comprised of portions 112, 116, 118 and 120. The ground plane to complete the antenna is provided by Antenna A' and elements 122, 134, 136, 138, 140, 142 and 144.

The purpose of the meander line configuration is to cancel out the reactance of plate 100 so as to provide a good impedance match with for instance, a 50 ohm balanced transmission line. When the reactance is cancelled out, the bandwidth of the antenna is widened considerably.

Figure 8:
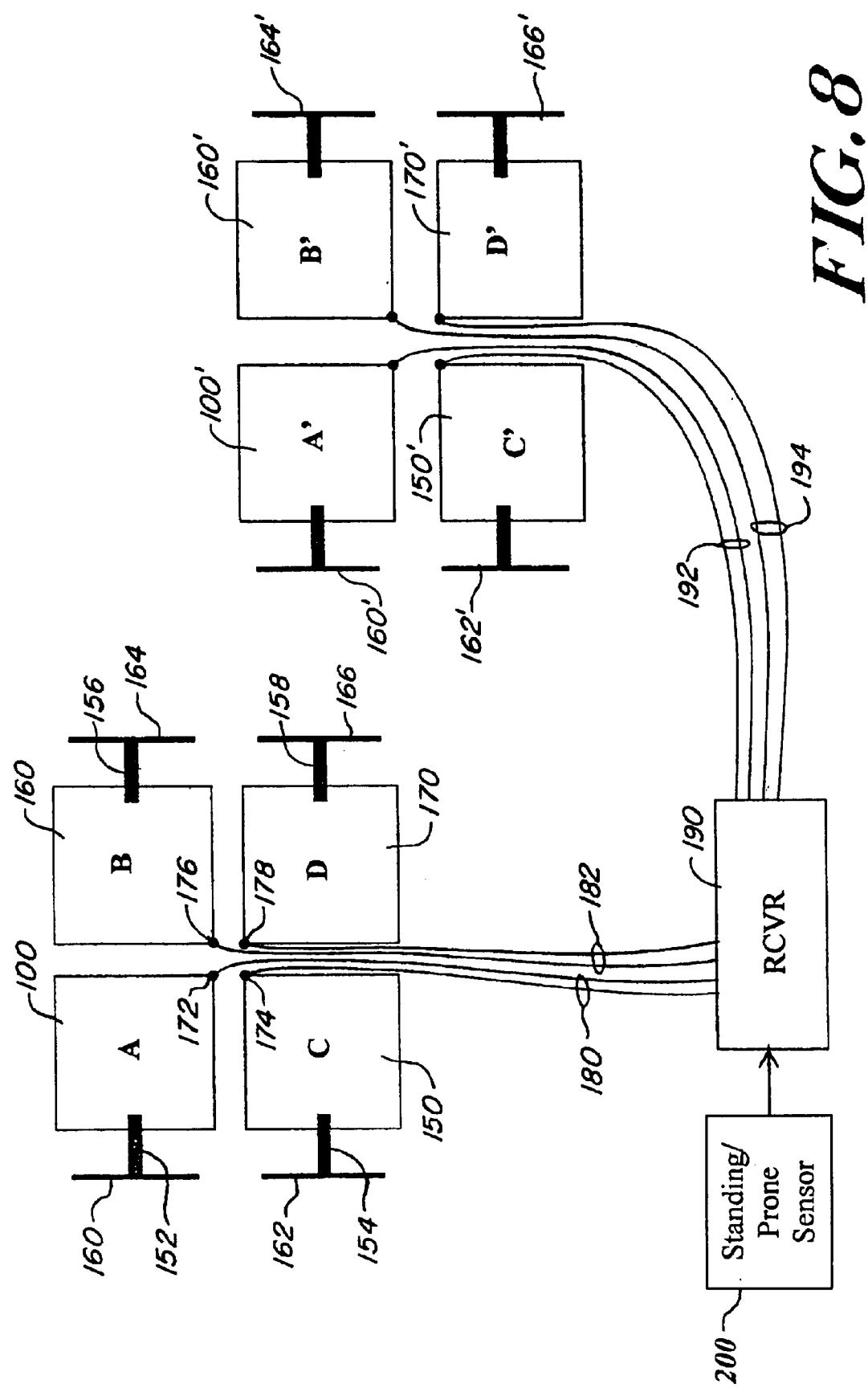
FIG. 8 is a front view of the meander line antennas indicating the balance line outputs of pairs of antennas.

Referring now to FIG. 8, a front view of the antenna configuration is shown in which antenna plates for A, C, B and D are shown respectively at 100, 150, 160 and 170. Here the meander lines are respectively illustrated at 152, 154, 156 and 158. Each of the meander lines incorporates the structures shown in FIG. 7, namely elements 112, 114, 116, 118 and 120. The respective side plates are illustrated for each of these antennas at 160, 162, 164 and 166.

The drive points or so-called spigots are between points 172 and 174 for antennas A and C, and 176 and 178 for antennas B and D. The balanced line for the pair A–C is generally indicated at 180 and at 182 for the pair B–D. These balanced transmission lines are coupled to receiver 190.

Likewise, the elements which create the virtual ground plane are plates 100', 150', 160' and 170' which duplicate in all aspects to the corresponding structures on the front part of the vest. Here the balanced transmission lines from these virtual component-generating elements are illustrated at 192 and 194, respectively for antennas A'–C' and antennas B'–D'.

It will be noted that purpose of the side plate in each of the antennas is identical to the vertical plate of the standard meander line loaded antenna which in one embodiment is perpendicular to respective plates 100, 150, 160 and 170, with side plates also having the same function for antennas A', C', B' and D'.

Referring back to FIG. 7, it will be appreciated that side plate 122 is a vertically upstanding portion relative to plate 100 which in effect is coupled to the virtual ground plane 102 by the structure A'.

In general, the direction finding is accomplished in a vertical or stand-up position by taking the outputs A–C available on transmission line 190 and B–D available on transmission line 182, the outputs A'–C' on transmission line 192, and B'–D' on transmission line 194. Each of these balanced inputs provides a voltage that has a real and an imaginary component. The voltages are thus complex numbers. As will be seen from the algorithm described above processing these voltages in a real and a complex form provides a set of data points which are compared with a set of data points that is generated during a calibration procedure. Note that whether a person is standing or prone is detected at 200 and the processing changed depending on the indicated position.

The calibration procedure is simply that an individual wearing the vest stands on a rotating plate that is rotated 360° in one degree increments. The data points to which the voltages are to be correlated or compared are generated by sweeping through the frequency band with a source removed from the turning individual, with the results tabulated in memory for each one degree of rotation. Thus there are 360 sets of voltages for each of the frequencies involved in the sweep. It will be appreciated that these points are valid for each frequency and each degree of rotation and are stored in a relatively large database. It is the correlation with the actual data coming through as the complex voltages on the four balanced transmission lines that when compared with the calibration values results in an output as to the bearing line to the particular source.

Experimental testing has been able to provide bearing lines having an accuracy of plus or minus of 2½ degrees for strong signal sources, with accuracy degrading depending on the strength of the incoming signal.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A man portable system for finding the direction of a source of electromagnetic radiation, comprising:
    a garment to be worn by an individual;
    direction finding antennas carried by said garment, each of said direction finding antennas including a meander line loaded antenna, each meander line loaded antenna having one plate on the front of said garment and having a ground plane plate on the rear of said garment, said front and rear plates having meander lines coupling respective plates together to form a virtual ground plane that runs through said individual when said garment is worn, said virtual ground plane completing each of said meander line loaded antennas; and,
    a direction finding module connected to said direction-finding antennas for determining the bearing of said source to said individual.

2. The system of claim 1, and further including a bearing line indicator coupled to said direction finding module for indicating the bearing of said source to said individual.

3. The system of claim 2, wherein said bearing line indicator includes circumferentially arrayed indicators and means for activating the indicator closest to said bearing line.

4. The system of claim 3, wherein said circumferentially arrayed indicators include vibrating devices.

5. The system of claim 4, wherein said direction finding antennas have a wide bandwidth to permit detection of electromagnetic radiation over a wide band of frequencies.

6. The system of claim 5, wherein said direction finding antennas include meander line loaded antennas.

7. The system of claim 6, wherein the frequency range of said direction-finding antennas is between 2 MHz and 40 GHz.

8. The system of claim 7, wherein each of said direction finding antennas each one plate on the front of said garment and have a virtual ground plane formed by a plate on the rear of said garment, said front and rear plates having meander lines which couple respective plates together to form a virtual ground plane that runs through said individual when said garment is worn, said virtual ground plane completing each of said meander line loaded antennas.

9. The system of claim 1, wherein each of said direction finding antennas includes a side plate and a meander line coupling said front plate to said side plate.

10. The system of claim 9, wherein corresponding front and rear plates utilize the same side plate.

11. The system of claim 10, wherein the corresponding front and rear plates, side plate and meander lines are identical, thus to form said virtual ground plane between said front and rear plates.

12. A wearable set of direction finding antennas, comprising:
    a front meander line loaded antenna embedded in a garment to be worn by an individual and positioned on the front of said individual, said front antenna having a plate and a meander line coupled thereto at one end thereof;
    a corresponding back meander line antenna on the back of said individual and configured to provide said front antenna with a virtual ground plane that runs at least partially through the body of said individual to complete the antenna on the front of said individual; and,
    a side plate coupled to the other end of said meander line and to the back antenna, said front and back antennas being electrically identical and connected together through said side plate.

13. The antennas of claim 12, and further including an array of four of said antennas on the front of said garment and four of said antennas on the back of said garment.

14. The antennas of claim 13, and further including a direction finding module coupled to pairs of said antennas, said module storing a set of outputs for said antennas generated by a transmission from an electromagnetic source, said set of outputs corresponding to measurements taken at angular increments for selected frequencies, and a correlator for correlating the outputs of said antennas to stored data to produce an output describing the bearing to a source of electromagnetic radiation.

15. A body wearable direction finding system, comprising:

an array of meander line loaded direction finding antennas on the front of an individual, each complete save for a ground plane component to run through the center of said individual;

a corresponding array of direction finding antennas on the back of said individual, each complete save for a virtual ground plane component to run through the center of said individual;

coupling means for connecting corresponding front and back antennas together to form a virtual ground plane usable by both said front and back antennas, whereby a physical ground plane need not be placed through the body of said individual; and, a direction finding module coupled to the outputs of said antennas for producing a signal representing the bearing line from a source of electromagnetic radiation to said individual.

16. The system of claim 15, wherein said direction finding antennas include loaded meander lines, said antennas having a wide bandwidth provided thereby.

17. The system of claim 15, and further including a signal processing module interposed between said direction finding antennas and said direction finding module for weeding out signals from selected sources, whereby the output of said direction finding module is only responsive to predetermined sources of electromagnetic signals.

* * * * *